US007056374B2

(12) United States Patent
Kitayama et al.

(10) Patent No.: US 7,056,374 B2

(45) Date of Patent: Jun. 6, 2006

(54) AQUEOUS INK COMPOSITION, WATER-SOLUBLE DYE COMPOSITION AND INK-JET RECORDING METHOD

(75) Inventors: Hirokazu Kitayama, Kita-ku (JP); Yasuo Shirasaki, Saitama (JP); Toru Tabei, Kitamoto (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 141 days.

(21) Appl. No.: 10/472,985

(22) PCT Filed: Apr. 1, 2002

(86) PCT No.: PCT/JP02/03261

§ 371 (c)(1),
(2), (4) Date: Dec. 17, 2003

(87) PCT Pub. No.: WO02/081580

PCT Pub. Date: Oct. 17, 2002

(65) Prior Publication Data

US 2004/0099180 A1 May 27, 2004

(30) Foreign Application Priority Data

Apr. 4, 2001 (JP) ............................ 2001-106340
Mar. 1, 2002 (JP) ............................ 2002-056281

(51) Int. Cl.
*C09D 11/00* (2006.01)
*C09B 29/36* (2006.01)
*C09B 56/04* (2006.01)
*B41J 2/01* (2006.01)

(52) U.S. Cl. ............................ 106/31.46; 106/31.48; 106/31.76; 106/31.77; 8/682; 534/691; 347/100

(58) Field of Classification Search ............ 106/31.46, 106/31.48, 31.76, 31.77; 347/100; 8/549, 8/682; 534/691
See application file for complete search history.

(56) References Cited

U.S. PATENT DOCUMENTS 3,310,551 A * 3/1967 Mcleod ...................... 534/691

(Continued)

FOREIGN PATENT DOCUMENTS

EP 1 251 319 10/1971

(Continued)

OTHER PUBLICATIONS

Copy of the Chinese Communication dated Dec. 30, 2004, together with its English translation.

(Continued)

*Primary Examiner*—Helene Klemanski
(74) *Attorney, Agent, or Firm*—Nields & Lemack

(57) ABSTRACT

An aqueous ink composition which comprises a compound represented by the formula (1) or the salt thereof: (1) wherein $R_1$ and $R_2$ independently represent a hydrogen atom, an alkyl group, an alkoxy group, an alkanoylamino group, an alkoxyalkoxy group, a sulfonic acid group, a carboxyl group or an ureido group, m and n independently represent 1 or 2, and $M_1$ represents a cation from a hydrogen atom, an alkali metal, an alkaline earth metal or an organic amine, or an ammonium ion. The composition has a hue and clarity suitable for the ink-jet recording, and can provide a recorded matter which is excellent in light resistance, water resistance and moisture resistance and can be controlled with respect to the degree of the discoloration or fading by the action of ozone.

(1)

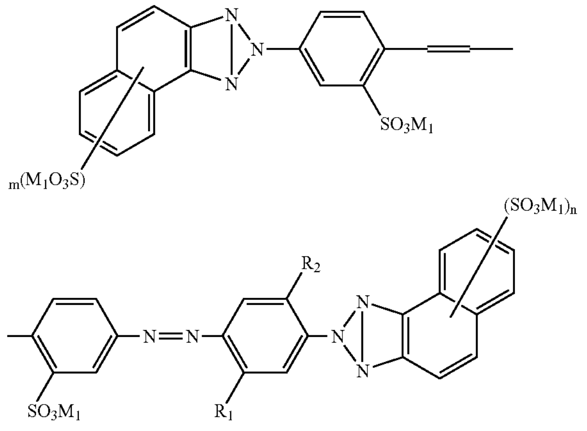

12 Claims, 1 Drawing Sheet

U.S. PATENT DOCUMENTS

| | | | | | |
|---|---|---|---|---|---|
| 3,575,954 | A | * | 4/1971 | Jirou et al. | 534/691 |
| 3,578,653 | A | * | 5/1971 | Wallace | 534/691 |
| 3,945,990 | A | | 3/1976 | Ikeda et al. | 260/153 |
| 4,167,629 | A | * | 9/1979 | Fleck et al. | 548/257 |
| 5,272,259 | A | * | 12/1993 | Claussen et al. | 534/689 |
| 5,360,472 | A | | 11/1994 | Radigan, Jr. et al. | 106/22 K |
| 5,785,718 | A | * | 7/1998 | Berneth et al. | 8/437 |

FOREIGN PATENT DOCUMENTS

| | | |
|---|---|---|
| JP | 47-18548 | 5/1972 |
| JP | 49-60332 | 6/1974 |
| JP | 47-18548 | 3/1976 |
| JP | 4-293969 | 10/1992 |
| JP | 7-62257 | 3/1995 |
| JP | 11-131002 | 5/1999 |

OTHER PUBLICATIONS

Copy of Taiwanese communication and an English translation dated Apr. 12, 2004.

Copy of the International Search Report dated Jul. 2, 2002.

* cited by examiner

AQUEOUS INK COMPOSITION, WATER-SOLUBLE DYE COMPOSITION AND INK-JET RECORDING METHOD

TECHNICAL FIELD

The present invention relates to an aqueous ink composition, a water-soluble dye composition and an ink-jet recording method using thereof.

BACKGROUND ART

As a recording method using an ink-jet printer, various kinds of diverse ink jetting systems have been developed, and for recording in these systems, ink droplets are generated and deposited to various recording materials (paper, film, cloth etc.). The recording method using an ink-jet printer is characterized in that because a recording head is not contacted with a recording material, the method is silent without generating sounds, and can without limitation print on uneven surfaces, soft materials, easily broken products, etc. Because of its features such as downsizing printers, higher speed and easy coloration, this recording method has spread rapidly in recent years, and is expected to expand significantly in the future. Images and literal information on a color display in a computer, when recorded in color by an ink-jet printer, are expressed generally by subtractive mixed colors using 4 color inks of yellow (Y), magenta (M), cyan (C) and black (K). To reproduce a subtractive mixed color image as faithfully as possible by a subtractive mixed color image of red (R), green (G) and blue (B) for CRT displays etc., it is desired that coloring matters used, particularly coloring matters used in YMC inks, have hues as near as possible to standard hues of YMC and are as vivid as possible. It is also desired that the ink composition is stable during storage for a long period, provides printed images with high density, and is superior to fastness such as water resistance, light resistance, moisture resistance, weathering resistance, ozone-gas resistance etc.

Weathering resistance refers to fastness in airy shades. Generally, when a coated paper called a glossy paper is printed and left in airy shadows for a long time, discoloration and fading often occur. The reason for such discoloration and fading is not definitely elucidated at present, however it is estimated that an interaction of ozone gas, oxidizing gases such as SOx, NOx etc. in the air with inorganic materials and/or polymers applied onto the processed paper causes the discoloration and fading of coloring matters. The coated paper to be used in exhibits such as posters etc. in various fields will be exposed to lights (electric lights, fluorescent lamps, sun rays etc.) in many cases, and thus there is demand for an ink composition excellent particularly in light resistance.

The ink-jet printer is used in broader fields ranging from small printers for OA to large printers in industry, and is desired to have higher fastness such as water resistance, light resistance, moisture resistance etc. than in the past. Water resistance and moisture resistance are under significant improvement by coating, together with PVA resin, organic or inorganic fine particles (e.g. cationic polymer, porous silica, alumina sol and special ceramics) capable of adsorbing coloring matters in ink, onto the surface of the paper. Various coated papers for ink-jet printers have been commercially available, and some coated papers are significantly improved. For improving light resistance, however, there has been no established technique, and improvement thereof is an important task. In recent years, an opportunity to print photographs is increasing because of improvements in printing qualities of ink-jet printers, and the coated paper (called a glossy paper) used in printing photographs has the problem of discoloration and fading attributable to gases, particularly an ozone gas, in the air. The respective dyes of yellow, magenta, cyan and black are faded at different levels, and it is an important task in recent years to improve the ozone-gas resistance of the respective colors during long-term storage and to uniformalize the fading levels of the respective colors by an ozone gas.

As a typical skeleton of a yellow coloring matter used in an aqueous ink for ink-jet recording, an azo dye is used. Some azo dyes used at present are excellent in hue and water resistance, but the azo dye is generally inferior in light resistance. The azo dye is inferior in light resistance to dyes such as cyan dyes, typically copper phthalocyanine dyes. However, a large number of yellow coloring matters are very excellent in ozone-gas resistance, thus allowing the fading of magenta, cyan and black to be remarkable in photographic printing. As a means to solve this problem, a dye having ozone-gas resistance in harmony with other colors is desired as the yellow coloring matter. The yellow coloring matters used at present cannot simultaneously satisfy hue, clarity, light resistance, water resistance, humidity resistance, ozone-gas resistance and dissolution stability.

The object of the present invention is to provide an aqueous ink composition which has a hue and clarity suitable for ink-jet recording, provides a recorded matter with high fastness such as light resistance and humidity resistance, and can regulate ozone-gas resistance in the magenta, cyan and black levels, as well as a water-soluble dye composition very excellent in shelf stability and a yellow coloring matter suitable therefor.

DISCLOSURE OF INVENTION

The present inventors made extensive study to solve the problem described above, and as a result, they arrived at the present invention. That is, the present invention relates to:

(1) an aqueous ink composition, which comprises a compound represented by the following formula (1), or a salt thereof:

(1)

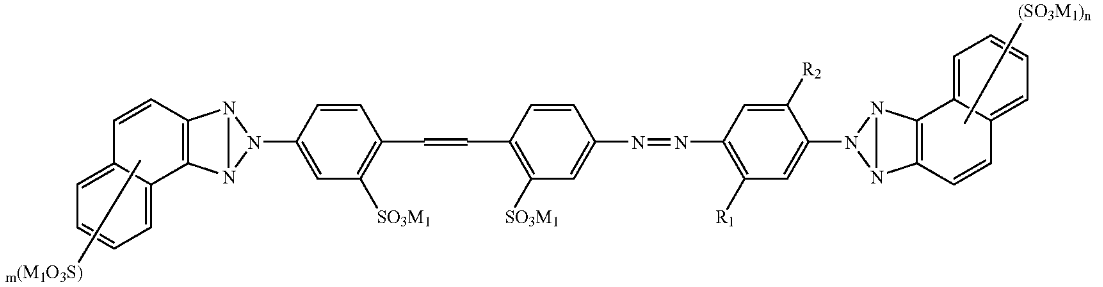

wherein $R_1$ and $R_2$ independently represent a hydrogen atom, an alkyl group, an alkoxy group, an alkanoylamino group, an alkoxyalkoxy group, a sulfonic acid group, a carboxyl group or an ureido group, m and n independently represent 1 or 2, and $M_1$ represents a cation from a hydrogen atom, an alkali metal, an alkaline earth metal or an organic amine, or an ammonium ion;

(2) an aqueous ink composition, which comprises an azo or the salt thereof, said compound having the absorption maximum in the range of 350 to 450 nm in a spectrophotometric absorption spectrum in which the concentration of the azo compound in water is regulated such that the absorbance of the absorption maximum in the range of 300 to 800 nm is in the range of 1 to 2 Abs, or a salt thereof, and the compound described in the above-mentioned (1) or a salt thereof;

(3) an aqueous ink composition, which comprises a compound represented by the following formula (2) or the salt thereof:

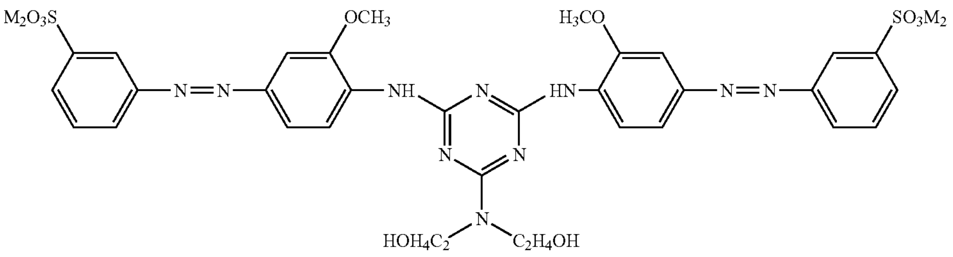

(2)

wherein $M_2$ represents a cation from a hydrogen atom, an alkali metal, an alkaline earth metal or an organic amine, or an ammonium ion, and the compound described in the above-mentioned (1) or the salt thereof;

(4) a water-soluble dye composition, which comprises 10 to 15% of the compound of formula (1) or a salt thereof and 5 to 20% of urea, and has an adjusted pH in the range of 6 to 10;

(5) a water-soluble dye composition, which comprises a mixture of compounds of formulae (1) and (2) or the salts thereof, and has an adjusted pH in the range of 6 to 10, and the concentration of the aqueous dye solution being in the range of 10 to 15%;

(6) the water-soluble dye composition according to the above-mentioned (4) or (5), wherein the content of inorganic salts in the water-soluble dye composition is 1% or less;

(7) an aqueous ink composition, which comprises the water-soluble dye composition described in any of the above-mentioned (4) to (6);

(8) the aqueous ink composition according to any of the above-mentioned (1) to (3) and (7), wherein said composition comprises water and a water-soluble organic solvent;

(9) the aqueous ink composition according to any of the above-mentioned (1) to (3), (7) and (8), wherein said composition is for ink-jet recording;

(10) an ink-jet recording method, which comprises using the aqueous ink composition described in any of the above-mentioned (1) to (3) and (7) to (9) as the ink in the ink-jet recording way that ink droplets are jetted responding to recording signal to record on a recording material;

(11) the ink-jet recording method according to the above-mentioned (10), wherein the recording material is an information transmission sheet; and

(12) an ink-jet printer provided with a container containing the aqueous ink composition described in any of the above-mentioned (1) to (3) and (7) to (9).

BEST MODE FOR CARRYING OUT THE INVENTION

Figure 1:
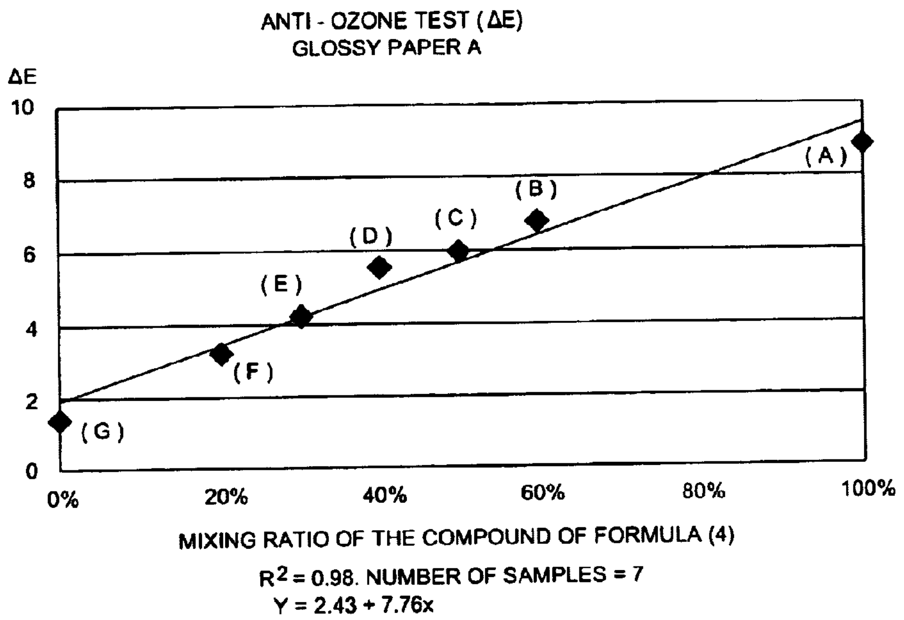
FIG. 1 is a graph showing the correlation of data on ozone-gas resistance in glossy paper A in Table 5 in Example 6. A mixing ratio of the compound of formula (4) (that is, the compound of formula (4)/(the compound of formula (4)+the compound of formula (6))×100 (%)) is shown on the abscissa (x), while color difference (ΔE) before and after the test is shown on the ordinate (y). (A) refers to the compound of formula (4); (B), formula (4)+formula (6) (a); (C), formula (4)+formula (6) (b); (D), formula (4)+formula (6) (c); (E), formula (4)+formula (6) (d); (F), formula (4)+formula (6) (e); and (G), the compound of formula (6).

The coloring matter component in the water-soluble dye composition and the aqueous ink composition according to the present invention is composed of a compound represented by formula (1) or a salt thereof alone or a combination of a compound represented by formula (1) or a salt thereof and another azo compound, or a combination of a compound represented by formula (1) or a salt thereof and a compound represented by formula (2) or a salt thereof. The compound of formula (1) can be produced by a method described in Japanese Patent Application Publication No. 47-18548. The compound of formula (2) can be produced by a method described in Japanese Patent Application Publication No. 55-11708.

In the formula (1), $R_1$ and $R_2$ independently represent a hydrogen atom, an alkyl group, an alkoxy group, an alkanoylamino group, an alkoxyalkoxy group, a sulfonic acid group, a carboxyl group or an ureido group. Examples of the alkyl group are methyl, ethyl, n-propyl, i-propyl, n-butyl, i-butyl, sec-butyl and tert-butyl, preferably methyl and ethyl. Examples of the alkoxy group are methoxy, ethoxy, n-propoxy, i-propoxy, n-butoxy, i-butoxy, sec-butoxy and tert-butoxy, preferably methoxy and ethoxy. Examples of the alkoxyalkoxy group are methoxymethoxy, methoxyethoxy, methoxypropoxy, methoxybutoxy, ethoxymethoxy, ethoxyethoxy, ethoxypropoxy, ethoxybutoxy, n-propoxypropoxy, i-propoxybutoxy, n-propoxybutoxy etc., preferably methoxyethoxy or ethoxyethoxy. Examples of the alkanoylamino group are acetylamino, n-propionylamino, i-propionylamino, hydroxyacetylamino, 2- or 3-hydroxy-n-propionylamino or butyroylamino, preferably acetylamino or n-propionylamino.

Preferable examples of the compound of the above formula (1) are not particularly limited, but specifically the structures shown in Table 1 below can be mentioned. In Table 1, the positions of sulfonic acid on rings A and B are shown for convenience's sake as shown in the formula (3) below. The positions of the sulfonic acid substituent groups are also as defined in the formula (3) below.

tion. Further, the sodium salt is dissolved in water and then precipitated in an acidic range by adding an acid, to give crystals which are then filtered to give a cake of the coloring matter in a free acid form. Then, the coloring matter in a free acid form is dissolved or suspended in water, followed by adding and dissolving a base corresponding to the desired salt, for example an amine or an alkali metal compound other than Na, whereby a solution of each salt can be obtained. From this solution, each salt is precipitated, filtered and dried in a usual manner, whereby a salt other than the sodium salt can be obtained.

The water-soluble dye composition and the aqueous ink composition according to the present invention comprise the compound of the formula (1) or a salt thereof dissolved in water or in water containing a water-soluble organic solvent, or the compounds of the formulae (1) and (2) or salts thereof dissolved in water or in water containing a water-soluble organic solvent. When this aqueous ink composition is used as ink for ink jet printers, the compounds of the formulae (1) and (2) or salts thereof are preferably those with a lower content of inorganic materials such as metal cation chloride, sulfate etc., and the content thereof, for example in terms of the total content of sodium chloride and sodium sulfate in the water-soluble dye composition, is not higher than 1% by weight, preferably not higher than 0.5% by weight.

The content of inorganic salts such as $Cl^-$ and $SO_4^{2-}$ is measured by ion chromatography; heavy metals by an atomic absorption method or ICP (inductively coupled plasma) emission analysis; and $Ca^{2+}$ and $Mg^{2+}$ by ion chromatography, an atomic absorption method or ICP emission analysis.

The content of inorganic salts in the coloring matter can be reduced for the ink composition of the present invention by desalting treatment as necessary by a conventional

TABLE 1

Examples of the compound (3)

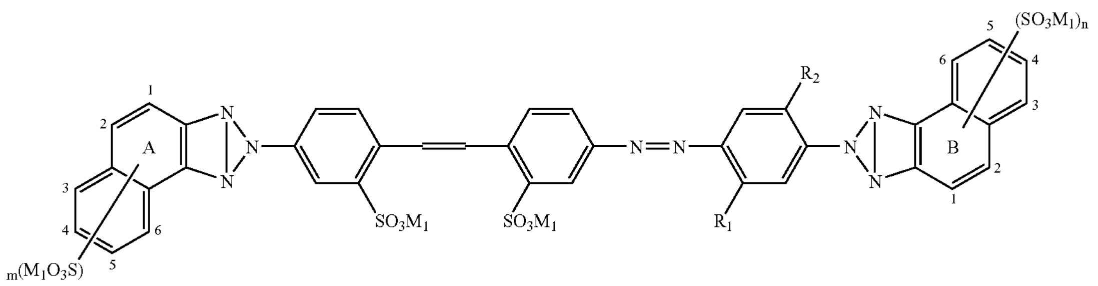

| No. | Position of the substituent group on ring A | Position of the substituent group on ring B | R1 | R2 |
|---|---|---|---|---|
| 1 | 2 | 4 | CH3 | H |
| 2 | 4 | 4 | CH3 | H |
| 3 | 2 | 4 | H | H |
| 4 | 4 | 4 | H | H |
| 5 | 2 | 4 | H | CH3 |
| 6 | 2 | 4 | CH3 | OCH3 |
| 7 | 2 | 4 | OCH3 | OCH3 |
| 8 | 2 | 4 | NHCOCH3 | H |
| 9 | 4 | 4 | NHCOC2H5 | H |
| 10 | 2 | 4 | OC2H5 | OC2H5 |
| 11 | 2 | 4, 6 | CH3 | H |
| 12 | 4, 6 | 4 | H | H |

In the formulae (1) and (2), $M_1$ and $M_2$ each represent a cation from a hydrogen atom, an alkali metal, an alkaline earth metal or an organic amine, or an ammonium ion. The alkali metal includes, for example, sodium, potassium, lithium etc. The alkaline earth metal includes, for example, calcium, magnesium etc. The organic amine includes, for example, methylamine, ethylamine, monoethanolamine, diethanolamine, triethanolamine, monoisopropanolamine, diisopropanolamine, triisopropanolamine etc. Preferable examples of $M_1$ and $M_2$ include a hydrogen atom, an alkaline metal such as sodium, potassium, lithium, an ammonium ion, and an alkanolamine ion such as monoethanolamine ion, diethanolamine ion, triethanolamine ion, monoisopropanolamine ion, diisopropanolamine ion, triisopropanolamine ion or the like. Salts thereof, for example a sodium salt thereof, can be obtained by adding common salt to a reaction solution and subsequent salting-out and filtramethod using a reverse osmosis membrane or by a method involving stirring a dried product or a wet cake of the coloring matter component of the present invention (the compound of the present invention or a salt thereof), preferably the wet cake, in a solvent (for example a water-containing lower alcohol, preferably a mixed solvent of methanol and water), then filtering and drying the compound.

When used in combination with the compound of formula (1) in the present invention, a suitable coloring component is an azo compound having the absorption maximum in the range of 350 to 450 nm in a spectrophotometric absorption. spectrum in which the concentration of the azo compound in water is regulated such that the absorbance of the absorption maximum in the range of 300 to 800 nm is in the range of 1 to 2 Abs. Examples of the azo compound include the following compounds from the color index, that is, C. I. Direct Yellow 27, C. I. Direct Yellow 28, C. I. Direct Yellow 33, C. I. Direct Yellow 34, C. I. Direct Yellow 39, C. I. Direct Yellow 44, C. I. Direct Yellow 86, C. I. Direct Yellow 100, C. I. Direct Yellow 120, C. I. Direct Yellow 132, C. I. Acid Yellow 3, C. I. Acid Yellow 17, C. I. Acid Yellow 19, C. I. Acid Yellow 23, C. I. Acid Yellow 25, C. I. Acid Yellow 29, C. I. Acid Yellow 38, C. I. Acid Yellow 49, C. I. Acid Yellow 59, C. I. Acid Yellow 61, C. I. Acid Yellow 72, etc.

The aqueous dye solution containing 10 to 15% dye of the formula (1) may be an aqueous dye solution containing 5 to 30%, preferably 5 to 20% urea so that the solution can be stably present without precipitating crystals even at low temperatures of 0 to 15° C. and without generating a viscosity gradient between the top and bottom of the aqueous solution. In consideration of decomposition of urea, it is preferable that the pH of the aqueous dye solution is in the range of 6 to 10. To allow the dye of the formula (1) to be stably present at low temperatures of 0 to 15° C. without incorporation of urea, the aqueous dye solution is prepared by adding the dye of the formula (2) in a predetermined ratio such that the total of the dyes of the formulae (1) and (2) is in the range of 10 to 15%. The ratio by weight of the compound of formula (1) or a salt thereof: the compound of formula (2) or a salt thereof is from 99:1 to 1:99, preferably from 99:1 to 10:90, more preferably from 99:1 to 20:80.

The aqueous ink composition of the present invention comprises the above-described coloring matter component dissolved in water, a water-rsoluble organic solvent and an ink preparation material. The pH of the ink is regulated preferably in the range of 5 to 11, more preferably 6 to 10. When this aqueous ink composition is used in an printer for ink-jet recording, the coloring matter component used is preferably the one having a lower content of inorganic salts such as metal cation chloride, sulfate etc. as described above.

The aqueous ink composition of the present invention is prepared by using water as the medium, and the coloring matter component is contained in an amount of preferably 0.1 to 10% by weight, more preferably 0.5 to 8% by weight, still more preferably 1 to 5% by weight, in the aqueous ink composition. The aqueous ink composition of the present invention may further contain a water-soluble organic solvent in an amount of not higher than about 60% by weight, preferably not higher than about 50% by weight, more preferably not higher than about 40% by weight, still more preferably not higher than about 30% by weight, and the lower limit may be 0%, but generally the amount of the water-soluble organic solvent is not less than about 5% by weight, more preferably not less than about 10% by weight, most preferably 10 to 30% by weight. The aqueous ink composition of the present invention may contain an ink preparation material in an amount of about 0 to 10% by weight, preferably not higher than 5% by weight. The balance excluding the above components is water.

Examples of the water-soluble organic solvents include, for example, C1 to C4 alkanols such as methanol, ethanol, propanol, isopropanol, butanol, isobutanol, secondary butanol, tertiary butanol etc.; lower carboxylic acid: (mono- or di-) lower alkylamides such as N,N-dimethylformamide or N,N-dimethylacetamide; lactams such as ϵ-caprolactam, N-methylpyrrolidin-2-one etc., preferably 4- to 8-memberred lactams; cyclic urea such as urea, 1,3-dimethylimidazolidin-2-one or 1,3-dimethylhexahydropyrimid-2-one, preferably 5- to 6-membered cyclic urea; ketones having a $C_{4-7}$ linear carbon chain, such as acetone, methyl ethyl ketone, 2-methyl-2-hydroxypentan-4-one etc., or ketoalcohol; ethers such as tetrahydrofuran, dioxane etc., preferably 5- to 6-membered cyclic ethers; mono-, oligo- or polyalkylene glycol or thioglycol having a C2 to C6 alkylene unit, such as ethylene glycol, 1,2-or 1,3-propylene glycol, 1,2- or 1,4-butyleneglycol, 1,6-hexylene glycol, diethylene-glycol, triethylene glycol, dipropylene glycol, thiodiglycol, polyethylene glycol, polypropylene glycol etc.; polyols such as glycerine, hexane-1,2,6-triol etc. (preferably triol having a $C_{3-6}$ carbon chain); C1 to C4 alkyl ethers of polyvalent alcohols (preferably ethylene glycol or polyethylene glycol), such as ethylene glycol monomethyl ether, ethylene glycol monoethyl ether, diethylene glycol monomethyl ether, diethylene glycol monoethyl ether, triethylene glycol monomethyl ether, triethylene glycol monoethyl ether etc.; and γ-butyrolactone or dimethyl sulfoxide. Some of these water-soluble organic solvents also have a function of solubilizing dyes.

Two or more of these water-soluble organic solvents may be simultaneously used. Preferable examples thereof include, for example, N-methylpyrrolidin-2-one, mono-, di- or trialkylene glycol having a C2 to C6 alkylene unit (preferably mono-, di- or triethylene glycol, dipropylene glycol) and dimethylsulfoxide, and particularly N-methylpyrrolidin-2-one, diethylene glycol or dimethyl sulfoxide is preferably used.

The ink preparation material include any components other than the above-described water, coloring matter component and water-soluble organic solvent, and examples thereof include an antiseptic and anti-corrosive agent, a pH adjusting agent, a chelating agent, a rust preventive, a water-soluble UV absorber, a water-soluble polymer compound, a surfactant etc. The antiseptic and anti-corrosive agent includes, for example, sodium dehydroacetate, sodium sorbate, sodium 2-pyridinethiol-1-oxide, sodium benzoate, sodium pentachlorophenol etc. The pH adjusting agent may be any arbitrary substances capable of regulating the pH of the ink in the range of 6to 11 without adversely affecting the ink prepared. Examples thereof include alkanolamines such as diethanolamine, triethanolamine etc., alkali metal hydroxides such as lithium hydroxide, sodium hydroxide, potassium hydroxide etc., ammonium hydroxide, and alkali metal carbonates such as lithium carbonate, sodium carbonate, potassium carbonate etc. The chelating agent includes, for example, sodium ethylenediaminetetraacetate, sodium nitrilotriacetate, sodium diethylenetriaminepentaacetate, sodium uracil diacetate etc. The rust preventive includes, for example, acidic sulfite, sodium thiosulfate, ammonium thioglycolate, diisopropyl ammonium nitrite, pentaerythritol tetranitrate; the water-soluble UV absorber includes, for example, sulfonated benzophenone, sulfonated benzotriazole etc.; the water-soluble polymer compound includes, for example, polyvinyl alcohol, polyamine, polyimine etc.; the dye solubilizer includes, for example, ϵ-caprolactam, urea, ethylene carbonate etc.; and the surfactant includes, for example, conventional anionic, cationic or nonionic surfactants.

The ink composition of the present invention is prepared by mixing the coloring matter of the present invention and if necessary the above-described water-soluble organic solvent, ink preparation material etc., with impurity-free water such as distilled water. Alternatively, the dye used in the present invention may be added to and dissolved in a mixture of water and the above water-soluble organic solvent, ink preparation material etc. If necessary, the resulting ink composition may be filtered to remove impurities.

Examples of the recording material used in the ink jet recoding method of the present invention include, for example, information transmission sheets such as paper, film etc.

The information transmission sheet is preferably a surface-treated sheet, specifically a sheet having a base material provided with an ink receiving layer. The ink receiving layer is arranged by impregnating or coating the base material with a cationic polymer or by applying, together with a hydrophilic polymer such as polyvinyl alcohol and polyvinyl pyrrolidone, inorganic fine particles (e.g. porous silica, alumina sol or special ceramics) capable of absorbing the coloring matter in ink, onto the surface of the base material. The paper having an ink receiving layer arranged thereon is usually called an ink jet special paper (film), glossy paper (film) etc., and is commercially available as, for example, Pictorico (Asahi Glass Co., Ltd.), color BJ paper, color BJ photo film sheet and professional photo paper (each of which is manufactured by Canon Inc.), color image jet paper (Sharp Corporation), superfine special glossy film, PM photo paper (Epson), Pictafine (Hitachi Maxell, Ltd.) etc. As a matter of course, the ink-jet recording method of the present invention can also be applied to paper.

An ink-jet recording method of the invention can be carried out, for example, by setting an ink-jet printer with the container containing the the above aqueous yellow ink composition, and then recording conventionally on a recording material. The ink-jet printer includes a piezo type printer utilizing the mechanical vibration and a bubble-jet type printer using bubbles generated by heating.

In the ink-jet recording method of the present invention, the aqueous yellow ink composition is used in combination with a magenta ink composition, a cyan ink composition, and if necessary a black ink composition.

The aqueous ink composition of the present invention is vivid with a yellow color of high chroma, and can give hues in the broad visible range by using it in combination with other magenta and cyan inks. By using the yellow-ink of the invention in combination with existing magenta, cyan and black excellent in light resistance, water resistance and moisture resistance, prints excellent in light resistance, water resistance and moisture resistance can be obtained. Ozone-gas resistance can be regulated so as to be adapted to the level of other colors such as magenta, cyan and black.

EXAMPLE

Hereinafter, the present invention is described in more detail by reference to the Examples. In the Examples, "parts" and "%" are based on weight unless otherwise specified.

Synthesis Examples

Example 1

Using starting materials specified on page 634 in Senryo Kagaku (Dye Chemistry) (authored by Yutaka Hosoda, Gihodo), a compound (formula (4) below) was synthesized according to a method described in Japanese Patent Application Publication No. 47-18548. The resulting compound was subjected to desalting treatment by a reverse osmosis membrane (manufactured by Teijin Ltd.) to reduce the content of inorganic materials. Content of inorganic salts: not higher than 0.5% by weight (NaCl, 3990 ppm; $Na_2SO_4$, 270 ppm)

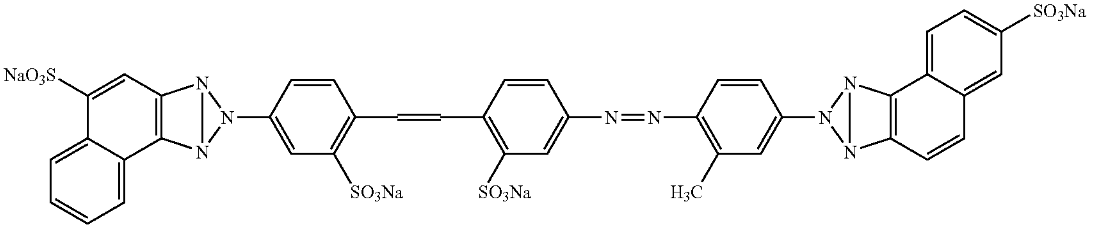

(4)

Example 2

A compound (formula (5) below) in the Examples described in Japanese Patent Application Publication No. 47-18548 was synthesized. The resulting compound was subjected to desalting treatment by a reverse osmosis membrane to reduce the content of inorganic materials.

Content of inorganic salts: not higher than 0.3% by weight (NaCl, 2384 ppm; $Na_2SO_4$, 402 ppm)

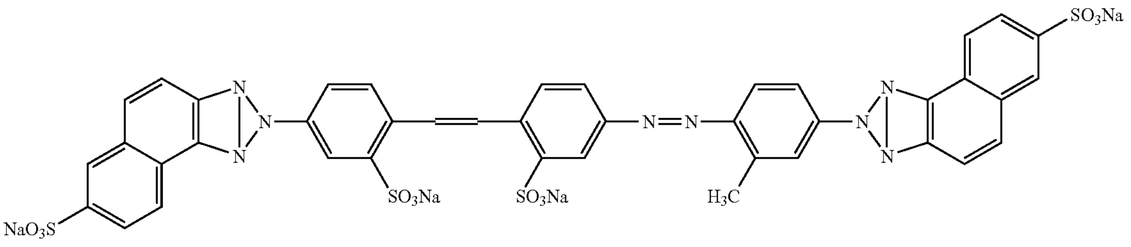

(5)

Example 3

A dye of the formula (2) above was synthesized according to a method described in Example 1 of Japanese Patent Application Publication No. 55-11708. The resulting compound (formula (6) below) was subjected to desalting treatment by a reverse osmosis membrane to reduce the content of inorganic materials.

Content of inorganic salts: not higher than 0.1% by weight (NaCl, 813 ppm; $Na_2SO_4$, 173 ppm)

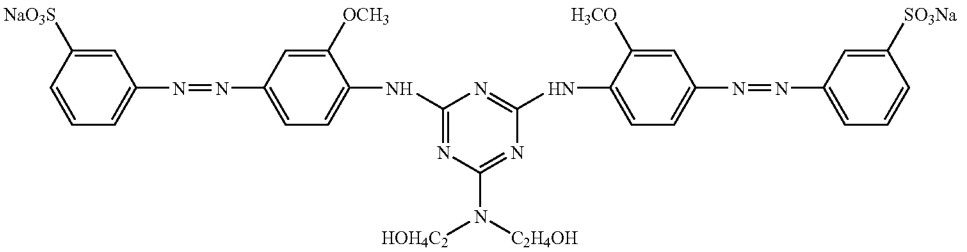

(6)

(Shelf Stability Test)

Example 4

10% aqueous dye solutions, pH 9, using the dye in Example 1, containing urea at concentrations of (1) 5%, (2) 10%, and (3) 20% respectively, were prepared. Separately, the dyes in Examples 1 and 3 were mixed in weight ratios of (4) 7:3, (5) 5:5, and (6) 3:7 respectively to prepare 10% aqueous dye solutions, pH 9. In the Comparative Examples, the compound obtained in Example 1 and the compound obtained in Example 3 were used to prepare 10% aqueous dye solutions, pH 9 (=the dye solutions in Comparative Examples 1 and 2) respectively.

The resulting dye compositions were left at 0° C. and 15° C. respectively. The results are shown in Table 2.

TABLE 2

| | Left at 0° C. | Left at 15° C. |
|---|---|---|
| Example 4 (1) | Not precipitated after 1 month | Not precipitated after 1 month |
| Example 4 (2) | Not precipitated after 1 month | Not precipitated after 1 month |
| Example 4 (3) | Not precipitated after 1 month | Not precipitated after 1 month |
| Example 4 (4) | Not precipitated after 1 month | Not precipitated after 1 month |
| Example 4 (5) | Not precipitated after 1 month | Not precipitated after 1 month |
| Example 4 (6) | Not precipitated after 1 month | Not precipitated after 1 month |
| Comparative Example 1 | Precipitated after 3 days | Precipitated after 7 days |
| Comparative Example 2 | Precipitated after 20 days | Not precipitated after 1 month |

As can be seen from the results in Table 2, the aqueous dye solutions prepared by adding urea to the dye of formula (4) when left at 0 to 15° C. are very stable for a long time without precipitation of precipitates or generation of foreign matter. It can also be seen that the aqueous dye solutions prepared by mixing the dyes of formulae (4) and (6) are similarly stable when left at 0 to 15° C.

(Preparation of Ink Compositions and Test Examples)

Example 5

(A) Preparation of Ink

A liquid of the following composition was prepared and filtered through a 0.45 μm membrane filter to give each aqueous ink composition for ink jetting. As water, deionized water was used. Water and caustic soda were added to each ink composition such that the pH was 8 to 10 and the total volume was 100 parts.

Example 6

As the coloring matter component in the ink composition, the compound of formula (4) obtained in Example 1, the compound of formula (5) obtained in Example 2, or mixtures of the compound of formula (4) and the compound of formula (6) in ratios of (a) 6:4, (b) 5:5, (c) 4:6, (d) 3:7, and (e) 2:8 respectively were used to prepare inks. The composition of each ink is shown in Table 3.

TABLE 3

| | |
|---|---|
| Each dye (coloring matter component) obtained in Example 6 (solids content) | 2.0 parts |
| Water + caustic soda | 79.0 parts |
| Glycerine | 5.0 parts |
| Urea | 5.0 parts |
| N-Methyl-2-pyrrolidone | 4.0 parts |
| IPA | 3.0 parts |
| Butyl carbitol | 2.0 parts |
| Total | 100.0 parts |

(B) Ink-Jet Print

Using an ink-jet printer (trade name: PICTY80L manufactured by NEC), three kinds of recording materials, that is, a plain paper (printer paper A4 TLB5A4S (manufactured by Canon Inc.)), glossy paper A (professional photo paper PR-101 (manufactured by Canon Inc.)) and glossy paper B (PM photo paper KA420PSK (manufactured by Epson)), were subjected to ink-jet recording. The test results of hue, clarity, light resistance, water resistance and moisture resistance of the aqueous yellow ink compositions of the present invention are shown in Table 4.

The test results of hue, clarity, light resistance, water resistance and moisture resistance of a similar ink composition prepared from C. I. Direct Yellow 132, which is conventionally used as the ink-jetting yellow coloring matter in the Comparative Example (Comparative Example 3), are shown in Table 4.

(C) Evaluation of Recorded Images

1. Evaluation of Hue

The hue and clarity of record images: The recording paper was measured for color by GRETAG SPM50 (GRETAG Co., Ltd.), and L*, a*, b* values were calculated. The clarity was evaluated according to the equation:

$$C^*=((a^*)^2+(b^*)^2))^{1/2}.$$

2. Light Resistance Test

The record images were irradiated for 40 hours by using a carbon arc fade meter (Suga Shikenki Co., Ltd.). The recorded images were evaluated according to ratings in blue scale prescribed in JIS L-0841 and simultaneously measured for color difference (ΔE) before and after the test by using the color measurement system mentioned above.

3. Water Resistance Test

The recording paper was placed in a beaker filled with water, then stirred for 2 minutes, removed and air-dried, evaluated for its change before and after the test by a JIS discoloration gray scale and simultaneously measured for color difference before and after the test by using the color measurement system mentioned above.

4. Moisture Resistance Test

Test pieces of glossy papers A and B were left at 40° C. under 80% RH for 3 days in a thermostat/humidistat unit (manufactured by Oyo Giken Sangyo Co., Ltd.), and spreading of the dye before and after the test was evaluated with the naked eye.

○: Slight spreading of the dye.

Δ: Spreading of the dye.

x: Significant spreading of the dye.

5. Anti-Ozone Gas Test

Printed samples of glossy papers A and B were left for 20 hours in an atmosphere at an ozone concentration of 2 ppm at a temperature of 40° C. in an ozone weather meter. After the test was finished, the color difference (ΔE) before and after the test was measured by using the above measurement system.

TABLE 4

| | Hue | | | Clarity | Light resistance | Water resistance | |
|---|---|---|---|---|---|---|---|
| | L* | a* | b* | (c*) | Judgment (ΔE) | Judgment (ΔE) | Humidity resistance |
| Compound of formula (4) | | | | | | | |
| Plain paper | 81.8 | 11.0 | 69.6 | 70.4 | Grade 5 (3.5) | Grade 5 (4.6) | — |
| Glossy paper A | 85.5 | 11.9 | 108.2 | 108.9 | Grade 5 (5.1) | Grade 5 (0.8) | ○ |
| Glossy paper B | 84.8 | 9.6 | 108.6 | 109.0 | Grade 5 (2.2) | Grade 5 (3.3) | ○ |
| Compound of formula (5) | | | | | | | |
| Plain paper | 82.0 | 10.2 | 70.0 | 70.8 | Grade 5 (2.8) | Grade 5 (3.3) | — |
| Glossy paper A | 86.1 | 8.2 | 101.3 | 101.6 | Grade 5 (4.8) | Grade 5 (1.4) | ○ |
| Glossy paper B | 85.0 | 7.6 | 105.6 | 105.9 | Grade 5 (2.5) | Grade 5 (2.7) | ○ |

TABLE 4-continued

| | Hue | | | Clarity | Light resistance | Water resistance | |
|---|---|---|---|---|---|---|---|
| | L* | a* | b* | (c*) | Judgment (ΔE) | Judgment (ΔE) | Humidity resistance |
| Compound of formula (4) + formula (6) (a) | | | | | | | |
| Plain paper | 84.9 | 9.7 | 75.1 | 75.7 | Grade 4 (11.3) | Grade 5 (4.3) | — |
| Glossy paper A | 86.7 | 8.5 | 107.8 | 108.1 | Grade 4–5 (7.5) | Grade 5 (1.1) | ○ |
| Glossy paper B | 85.7 | 7.4 | 110.1 | 110.3 | Grade 4 (10.1) | Grade 5 (3.5) | ○ |
| Compound of formula (4) + formula (6) (b) | | | | | | | |
| Plain paper | 85.3 | 9.0 | 75.6 | 76.2 | Grade 4 (12.8) | Grade 5 (3.2) | — |
| Glossy paper A | 87.5 | 6.5 | 106.8 | 106.9 | Grade 4–5 (7.9) | Grade 5 (1.0) | ○ |
| Glossy paper B | 86.3 | 5.6 | 108.9 | 109.0 | Grade 4 (12.3) | Grade 5 (3.3) | ○ |
| Compound of formula (4) + formula (6) (c) | | | | | | | |
| Plain paper | 85.5 | 8.2 | 76.1 | 76.5 | Grade 3–4 (14.7) | Grade 5 (1.9) | — |
| Glossy paper A | 87.7 | 5.7 | 106.4 | 106.5 | Grade 4–5 (8.6) | Grade 5 (0.4) | ○ |
| Glossy paper B | 86.7 | 4.4 | 108.2 | 108.3 | Grade 3–4 (14.6) | Grade 5 (2.6) | ○ |
| Compound of formula (4) + formula (6) (d) | | | | | | | |
| Plain paper | 83.5 | 5.5 | 73.8 | 74.0 | Grade 3–4 (16.6) | Grade 5 (4.0) | — |
| Glossy paper A | 88.4 | 3.6 | 104.7 | 104.7 | Grade 4 (10.4) | Grade 5 (0.5) | ○ |
| Glossy paper B | 87.8 | 1.9 | 106.2 | 106.2 | Grade 3–4 (18.0) | Grade 5 (3.3) | ○ |
| Compound of formula (4) + formula (6) (e) | | | | | | | |
| Plain paper | 84.4 | 5.3 | 73.2 | 73.3 | Grade 3–4 (16.8) | Grade 5 (3.4) | — |
| Glossy paper A | 88.7 | 3.0 | 104.9 | 104.9 | Grade 4 (10.5) | Grade 5 (0.8) | ○ |
| Glossy paper B | 88.3 | 1.0 | 105.7 | 105.7 | Grade 3 (19.8) | Grade 5 (2.5) | ○ |
| Comparative Example 3 | | | | | | | |
| Plain paper | 85.0 | 2.2 | 57.9 | 58.0 | Grade 1 (37.3) | Grade 1 (46.7) | — |
| Glossy paper A | 90.5 | −1.8 | 98.7 | 98.8 | Grade 1 (35.0) | Grade 4 (5.4) | Δ |
| Glossy paper B | 89.5 | −3.2 | 101.8 | 101.8 | Grade 1 (49.2) | Grade 5 (3.4) | Δ |

As can be seen from Table 4, the inks prepared from the compounds of formulae (4) and (5) in the present invention are very excellent in water resistance in the plain paper and glossy paper, and are also superior in light resistance and humidity resistance to the ink of Comparative Example 3. Further, when the compounds of formulae (4) and (6) are mixed, the resulting ink compositions are excellent in water resistance, light resistance and humidity resistance. It can be seen that the aqueous ink compositions of the present invention are vivid yellow of high chroma excellent in hue.

TABLE 5

| | Ozone-gas resistance (ΔE) | |
|---|---|---|
| | Glossy paper A | Glossy paper B |
| Compound of formula (4) | 10.1 | 8.7 |
| Compound of formula (5) | 11.6 | 9.0 |
| Formula (4) + formula (6) (a) | 7.1 | 6.7 |
| Formula (4) + formula (6) (b) | 6.0 | 5.9 |
| Formula (4) + formula (6) (c) | 5.6 | 5.5 |
| Formula (4) + formula (6) (d) | 5.2 | 4.2 |
| Formula (4) + formula (6) (e) | 4.4 | 3.2 |
| Compound of formula (6) | 1.9 | 1.4 |
| Comparative Example 3 | 1.9 | 2.1 |

Figure 2:
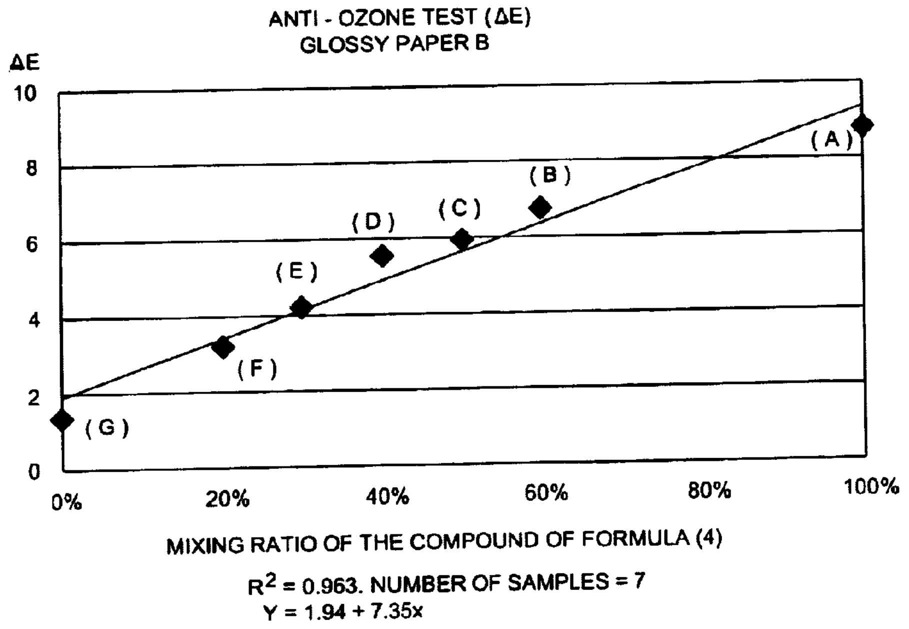
FIG. 2 is a graph showing the correlation of data on ozone-gas resistance in glossy paper B in Table 5 in Example 6. The abscissa (x), ordinate (y), and (A) to (G) have the same meanings as in FIG. 1.

The correlation of data on ozone-gas resistance among the compounds of formulae (4) and (6) and the mixtures ((a) to (e) in a predetermined ratio in glossy papers A and B is shown in FIGS. 1 and 2.

As can be seen from Table 5, the inks prepared from the compounds of formulae (4) and (5) show a high degree of fading by the action of ozone. As can also be seen from FIGS. 1 and 2, the level of ozone-gas resistance can be controlled by formulating the compound of formula (6).

As can be seen from the foregoing, the water-soluble dye composition of the present invention can be used to prepare a very excellent yellow ink for ink jetting with broad applicability.

INDUSTRIAL APPLICABILITY

The water-soluble dye composition of the present invention is very excellent in water solubility, and even after left for a long time under severe conditions at 0 to 15° C., the dye composition prepared at a relatively high concentration does not generate precipitates or matter, and is thus excellent in shelf stability as an aqueous dye solution at high concentration. Further, the water-soluble dye composition is characterized by an excellent ability to be filtered through a membrane filter in a process for producing the ink composition, thus allowing ink to be prepared at high concentration as an ink-jetting coloring matter. Further, its color value is also high. The ink composition of the present invention is excellent in shelf stability without crystalline precipitation, change in physical properties, change in color, etc. after storage for a long period. Further, prints using the ink composition of the present invention as yellow ink for ink-jet recording are excellent in light resistance, water resistance and moisture resistance, and can be used in combination with magenta, cyan and black dyes, to achieve ink-jet recording excellent in light resistance, water resistance and moisture resistance. With respect to ozone-gas resistance, the level of discoloration or fading of the coloring matter can be controlled by using the coloring matter in combination with another yellow dye. In addition, the surfaces of prints are vivid and suitable for yellow hue so that hues in a broader visible range can be attained by using the ink composition in combination with other magenta and cyan inks. Accordingly, the ink composition of the present invention is very useful as yellow ink for ink-jet recording.

The invention claimed is:

1. An aqueous ink composition, which comprises a compound represented by the following formula (3) or the salt thereof:

(3)

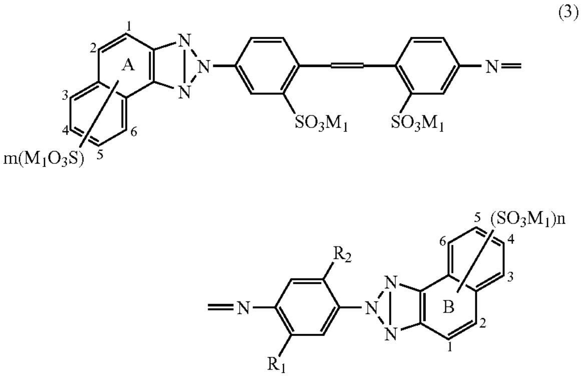

wherein the position of the substituent group on ring A is the 2-position and the position of the substituent group on ring B is the 4-position, $R_1$ represents a methyl group and $R_2$ represents a hydrogen atom, m and n independently represent 1, and $M_1$ represents a cation from a hydrogen atom, an alkali metal, an alkaline earth metal or an organic amine, or an ammonium ion.

2. The aqueous ink composition of claim 1, further comprising an azo compound selected from C. I. Direct Yellow 27, 0.1. Direct Yellow 28, 0.1. Direct Yellow 33, C. I. Direct Yellow 34, C. I. Direct Yellow 39, C. I. Direct Yellow 44, C. I. Direct Yellow 86, C. I. Direct Yellow 100, C. I. Direct Yellow 100, C. I. Direct Yellow 120, C. I. Direct Yellow 132, C. I. Acid Yellow 3, C. I. Acid Yellow 17, C. I. Acid Yellow 19, C. I. Acid Yellow 23, C. I. Acid Yellow 25, C. I. Acid Yellow 29, C. I. Acid Yellow 38, C. I. Acid Yellow 49, C. I. Acid Yellow 59, C. I. Acid Yellow 61 or C. I. Acid Yellow 72 or the salt thereof, said compound having the absorption maximum in the range of 350 to 450 nm in a spectrophotometric absorption spectrum in which the concentration of the azo compound in water is regulated such that the absorbance of the absorption maximum in the range of 300 to 800 nm is in the range of 1 to 2 Abs.

3. The aqueous ink composition of claim 1, further comprising a compound represented by the following formula (2) or the salt thereof:

(2)

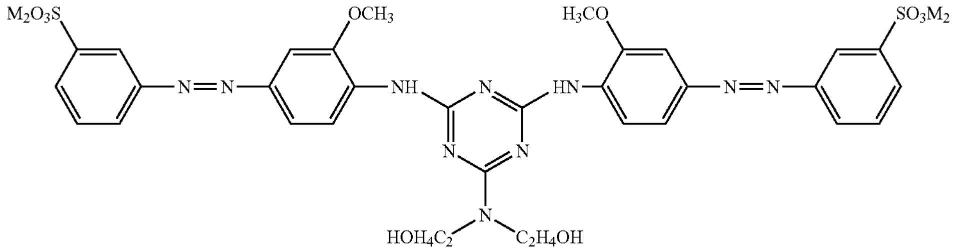

wherein $M_2$ represents a cation from a hydrogen atom, an alkali metal, an alkaline earth metal or an organic amine, or an ammonium ion.

4. A water-soluble dye composition, which comprises 10 to 15% by weight of the compound of formula (3) or the salt thereof:

(3)

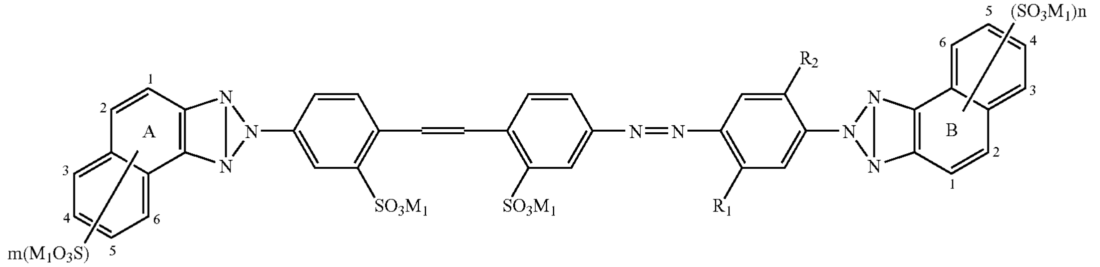

wherein the position of the substituent group on ring A is the 2-position and the position of the substituent group on ring B is the 4-position, $R_1$ represents a methyl group and $R_2$ represents a hydrogen atom, m and n independently represent 1, and $M_1$ represents a cation from a hydrogen atom, an alkali metal, an alkaline earth metal or an organic amine, or an ammonium ion;

and 5 to 20% by weight of urea, and has an adjusted pH in the range of 6 to 10.

5. A water-soluble dye comprising a aqueous dye solution which comprises a mixture of compounds of formulae (3) and (2) or the salts thereof:

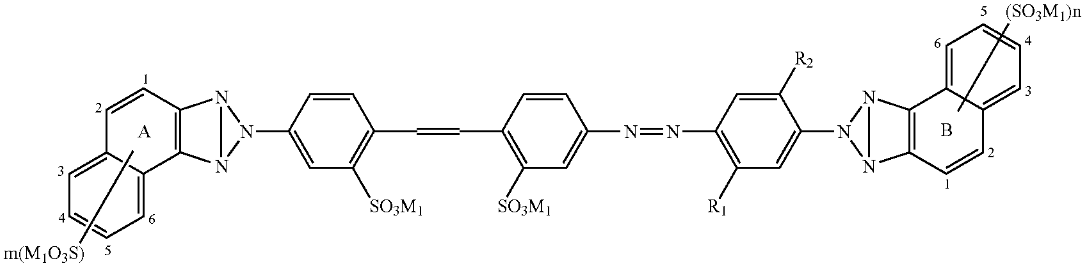

(3)

wherein the position of the substituent group on ring A is the 2-position and the position of the substituent group on ring B is the 4-position, $R_1$ represents a methyl group and $R_2$ represents a hydrogen atom, m and n independently represent 1, and $M_1$ represents a cation from a hydrogen atom, an alkali metal, an alkaline earth metal or an organic amine, or an ammonium ion;

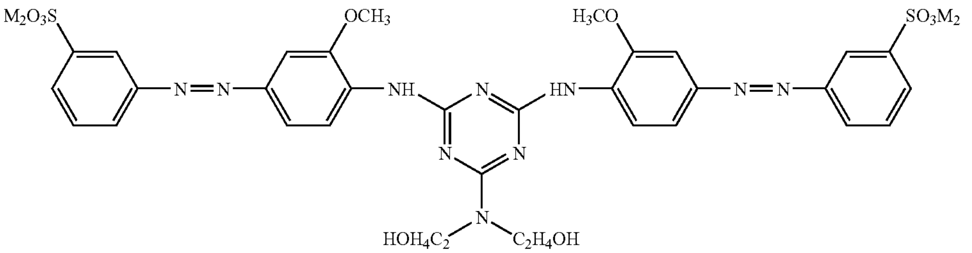

(2)

wherein $M_2$ represents a cation from a hydrogen atom, an alkali metal, an alkaline earth metal or an organic amine, or an ammonium ion;

and has an adjusted pH in the range of 6 to 10, and the concentration of the aqueous dye solution being in the range of 10 to 15% by weight.

6. The water-soluble dye composition according to claim 4 or 5, wherein the content of inorganic salts in the water-soluble dye composition is 1% by weight or less.

7. An aqueous ink composition, which comprises the water-soluble dye composition according to claim 4 or 5.

8. The aqueous ink composition according to claim 1, wherein said composition comprises water and a water-soluble organic solvent.

9. The aqueous ink composition according to claim 1, wherein said composition is for ink-jet recording.

10. An ink-jet recording method, which comprises jetting ink droplets of the aqueous ink composition according to claim 1 in response to a recording signal to record on a recording material.

11. The ink-jet recording method according to claim 10, wherein the recording material is an information transmission sheet.

12. An ink-jet printer provided with a container containing the aqueous ink composition according to claim 1.

* * * * *